US010030980B2

(12) United States Patent
Nowak et al.

(10) Patent No.: US 10,030,980 B2
(45) Date of Patent: Jul. 24, 2018

(54) METHOD OF CREATING MAP DATA

(75) Inventors: Wojciech Tomasz Nowak, Konstantynow Lodzki (PL); Sven Coppens, Gentbrugge (BE)

(73) Assignee: TOMTOM GLOBAL CONTENT B.V., Amsterdam (NL)

( * ) Notice: Subject to any disclaimer, the term of this patent is extended or adjusted under 35 U.S.C. 154(b) by 0 days.

(21) Appl. No.: 13/392,526

(22) PCT Filed: Feb. 15, 2010

(86) PCT No.: PCT/EP2010/051865
§ 371 (c)(1),
(2), (4) Date: Feb. 27, 2012

(87) PCT Pub. No.: WO2011/023417
PCT Pub. Date: Mar. 3, 2011

(65) Prior Publication Data
US 2012/0158286 A1 Jun. 21, 2012

Related U.S. Application Data

(60) Provisional application No. 61/272,164, filed on Aug. 25, 2009.

(51) Int. Cl.
*G01C 21/00* (2006.01)
*G01C 21/26* (2006.01)
*G06T 17/05* (2011.01)

(52) U.S. Cl.
CPC .............. *G01C 21/26* (2013.01); *G06T 17/05* (2013.01)

(58) Field of Classification Search
CPC ................. G01C 21/26; G06T 17/05
(Continued)

(56) References Cited

U.S. PATENT DOCUMENTS 7,149,626 B1 12/2006 Devries et al.
2003/0234725 A1* 12/2003 Lemelson .............. G08B 7/066
340/521
(Continued)

FOREIGN PATENT DOCUMENTS

EP 1003018 A2 5/2000
EP 1612707 A2 1/2006
(Continued)

OTHER PUBLICATIONS

XP031068713—Petteri Nurmi et al: "Identifying meaningful locations" Mobile and Ubiquitous Systems: Networking & Services, 2006 Third ANnual International Conference on, IEEE, PI. Jul. 1, 2006.
(Continued)

*Primary Examiner* — Redhwan K Mawari
*Assistant Examiner* — Rodney P King

(57) ABSTRACT

A computerized method of creating map data from a plurality of trips where each trip comprises position data derived from the positions of at least one navigation device over a period of time, the method comprising using a processing circuitry to perform the following steps: i. processing the position data; ii. calculating, from the processing of the position data, trip terminal positions at which the navigation device started to generate positions and/or stopped generating positions and which provide an end point of a trip; iii. performing statistical analysis on the terminal positions in order to determine origin locations at which trips commonly terminate and/or originate; iv. generating further map data, which comprises the origin locations.

20 Claims, 20 Drawing Sheets

(58) Field of Classification Search
USPC .................. 701/400, 409, 410, 532, 533
See application file for complete search history.

(56) References Cited

U.S. PATENT DOCUMENTS

| | | |
|---|---|---|
| 2007/0208495 A1* | 9/2007 | Chapman et al. ............ 701/117 |
| 2007/0219711 A1* | 9/2007 | Kaldewey .............. G01C 21/00 |
| | | 701/434 |
| 2008/0077326 A1* | 3/2008 | Funk et al. ................... 701/220 |
| 2008/0125959 A1* | 5/2008 | Doherty et al. ............. 701/200 |
| 2011/0178701 A1* | 7/2011 | Gupta .................... G01C 21/20 |
| | | 701/465 |

FOREIGN PATENT DOCUMENTS

| | | |
|---|---|---|
| WO | 2008048088 A1 | 4/2008 |
| WO | 2008052356 A1 | 5/2008 |

OTHER PUBLICATIONS

XP031189302—Changqing Zhou et al: "Mining Personally Important Places from GPS Tracks" Data Engineering Workshop, 2007 IEEE 23rd International Conference on, IEEE, PI. Apr. 1, 2007.

XP005737057—Mayer et al: "Building facade interpretation from uncalibrated widebaseline image sequences" ISPRS Journal of Photogrammetry and Remote Sensing, Amsterdam. Jan. 20, 2007.

\* cited by examiner

METHOD OF CREATING MAP DATA

CROSS-REFERENCE TO RELATED APPLICATIONS

This application is the National Stage of International Application No. PCT/EP2010/051865, filed 15 Feb. 2010, and designating the United States. The entire content of this application is incorporated herein by reference. This application claims priority from U.S. provisional application No. 61/272,164, filed 25 Aug. 2009. The entire content of this application is also incorporated herein by reference.

FIELD OF THE INVENTION

The invention relates to a method of processing positioning data and in particular to processing positioning data in order to generate map data arranged to be used in navigation devices and in particular, but not especially in a Portable Navigation Device (PND). The invention also provides related apparatus for providing the method.

BACKGROUND TO THE INVENTION

Map data for electronic navigation devices, such as GPS based personal navigation devices like the GO™ from TomTom International BV, comes from specialist map vendors such as Tele Atlas Nev. Such devices are also referred to as Portable Navigation Devices (PND's). This map data is specially designed to be used by route guidance algorithms, typically using location data from the GPS system. For example, roads can be described as lines—i.e. vectors (e.g. start point, end point, direction for a road, with an entire road being made up of many hundreds of such segments, each uniquely defined by start point/end point direction parameters). A map is then a set of such road segments, data associated with each segment (speed limit; travel direction, etc.) plus points of interest (POI's), plus road names, plus other geographic features like park boundaries, river boundaries, etc., all of which are defined in terms of vectors. All map features (e.g. road segments, POI's etc.) are typically defined in a co-ordinate system that corresponds with or relates to the GPS co-ordinate system, enabling a device's position as determined through a GPS system to be located onto the relevant road shown in a map and for an optimal route to be planned to a destination.

To construct this map database, Tele Atlas utilises basic road information from various sources, such as the Ordnance Survey for roads in England. It also includes, but is not limited to, the deployment of a large, dedicated team of vehicles driving on roads, plus personnel checking other maps and aerial photographs, to update and check its data. This data constitutes the core of the Tele Atlas map database. This map database is being continuously enhanced with geo-referenced data. It is then checked and published multiple times a year to device manufacturers like TomTom.

GPS navigation systems are also know for use by pedestrians. Indeed, it is possible to use personal navigation devices such as the TomTom™ GO™ whilst a pedestrian as well as within or on a vehicle. However, the map data provided by vendors such as Tele Atlas may not contain as much detail as is desirable in order to provide directions, especially for pedestrians. Thus, it is desirable to be able to increase the information content of such map data.

SUMMARY OF THE INVENTION

According to a first aspect of the invention there is provided a computerised method of creating map data from a plurality of trips where each trip comprises position data derived from the positions of at least one navigation device over a period of time, the method comprising using a processing circuitry to perform the following steps:
 i. processing the position data;
 ii. calculating, from the processing of the position data, trip terminal positions at which the navigation device started to generate positions and/or stopped generating positions and which provide the termination of a trip;
 iii. performing statistical analysis on the terminal positions in order to determine origin locations at which trips commonly terminate and/or originate;
 iv. generating further map data, which comprises the origin locations.

Such a method is convenient because it provides more detailed information in the map data. Such more detailed information can be used to provide more accurate routing information. Such information might also be useful in allowing the so generated map data to generate to and/or from the origin locations.

The statistical analysis may comprise generating clusters, each of which comprises a plurality of terminal positions and which are used to generate the origin positions therefrom. Such clustering provides a convenient mathematical technique by which to generate the origin positions. However, the skilled person will appreciate that other mathematical processes may be possible.

The method may comprise determining a co-ordinate for each cluster, which might be a centre region of a cluster. Such a method should lead to more accurate location of the origin location.

Other embodiments, may generate a co-ordinate for each origin position which has been generated by other mathematical techniques.

Generally, the origin locations correspond to entrance and/or exits. These might be the entrance and/or exits of a building, a bridge, an under/over pass or the like. As such, an origin position provides a point within the map data at which navigation devices commonly lose and/or obtain satellite signals.

It will be appreciated that some origin locations may be just an exit whilst other origin locations may be just an entrance. The method may determine this by analyzing the direction of travel to and/or from each origin location.

The method may further comprise marking within the map data the positions of structures that contain the origin locations. Further, the origin locations may be marked in association with the structures. As such, the map data may be used to determine the locations of the entrances and/or exits within a building or other structure. Currently, it is technically difficult to determine the start and/or end points of routes that origin from buildings. Embodiments of the invention may allow routes to be given from and entrance/exit to another entrance/exit. Such routes may be referred to as door to door.

Such embodiments, when the origin locations correspond to entrance/exits, may allow navigation devices to generate route information to and/or from entrance and exits.

The position data may be obtained from more than one data source. In one embodiment, the position data is obtained from at least one of: GPS data; INS (Inertial Navigation System) Data; image processing, GIS data (Geographic Information System) data set. Such image processing may be to obtain the position of entrances and/or exits. In such embodiments, data from a plurality of sources may be merged before the origin locations are determined. Such embodiments, may allow greater accuracy to be achieved.

The method may fuse data from a variety of sources. Such data fusion can help overcome problems with lack of data resolution and increase the accuracy.

In other additional, or alternative, embodiments origin locations generated by the method may subsequently be merged with data from further sources. Such further sources may conveniently provide the location of a navigation device inside a structure, such as a building or the like. Thus, in such embodiments, the origin locations may be generated from processing position data and once the origin locations have been determined further processing is performed.

Further in these alternative, or additional embodiments, the further data may be intersected with the footprint of a structure in order to give the location of an entrance and/or exit to the structure.

The map data may comprise navigable segments, each segment of which represents a portion of a navigable route within the area covered by the map data.

According to a second aspect of the invention there is provided a machine arranged to create map data, wherein the machine is arranged to receive and process position data from at least one source, the position data comprises the positions of at least one navigation device over a period of time, the machine being arranged to:
  i. process the position data;
  ii. calculate trip terminal positions at which the navigation device generating that trip started to generate and/or stopped generating positions;
  iii. perform statistical processing on the terminal positions between the trips in order to determine origin positions at which a plurality of trips terminate and/or originate; and
  iv. generate map data comprising the origin positions.

According to a third aspect of the invention there is provided map data comprising data on the positions of structures and associated with those structures is the location of exits and/or entrances thereto.

According to a fourth aspect of the invention there is provided a navigation device which is programmed with map data according to the third aspect of the invention.

Conveniently, the navigation device is arranged to provide navigation instructions based upon the map data. For example, the navigation device may be arranged to provide instructions, to a user thereof, on directions to take to arrive at a destination that the user has input to the device.

In one embodiment, the navigation device is arranged to provide navigation instructions to at least one of the origin locations contained within the map data. Conveniently, the device is arranged to allow a user to input to which origin location he/she would like directions. Thus, if the origin locations correspond to entrances/exits then the navigation device is then arranged to provide directions to a user thereof as to how to arrive at that entrance/exit. Such an arrangement may be more convenient that current systems which do not provide that level of granularity.

According to a fifth aspect of the invention there is provided a method of providing directions to a user of a navigation device, the method comprising:
  i. allowing a user to input his/her desired destination;
  ii. determining an origin location associated with that desired destination; and
  iii. providing directions to the user as to how to reach that origin location.

If a destination has more than one origin location then the method may allow a user to select to which origin location he/she wishes to be directed. Such a method is likely to be advantageous since it will take a user to a desired entrance/exit rather than simply the building as whole; it will be appreciate that if the building is a large building there could potentially be tens or hundreds of meters between entrances and exits.

According to a sixth aspect of the invention there is provided a machine readable data carrier containing instructions which when read by a machine cause that machine to perform the method of the first aspect of the invention or as the apparatus of the second aspect of the invention.

In any of the above aspects of the invention the machine readable medium may comprise any of the following: a floppy disk, a CD ROM, a DVD ROM/RAM (including a −R/−RW and +R/+RW), a hard drive, a solid state memory (including a USB memory key, an SD card, a Memorystick™, a compact flash card, or the like), a tape, any other form of magneto optical storage, a transmitted signal (including an Internet download, an FTP transfer, etc), a wire, or any other suitable medium.

Further, the skilled person will appreciate that features discussed in relation to any one aspects of the invention are suitable, mutatis mutandis, for other aspects of the invention.

Aspects of the invention above discuss that generation of map data is a step in the methods and machine arrangements thereof. The skilled person will appreciate that this may be an optional step and not essential to the invention.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF EMBODIMENTS OF INVENTION

Embodiments of the present invention will now be described with particular reference to a PND (Portable Navigation Device). In particular, in this embodiment, a PND in the context of embodiments of this invention may be a device that is arranged to be carried by a pedestrian. However, this is not exclusively the case and other embodiments may be applied to navigation device associated with other modes of transport.

It should be remembered, however, that the teachings of the present invention are not limited to PND's but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, a map server (such as providing routing and navigation functionality over the internet), or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
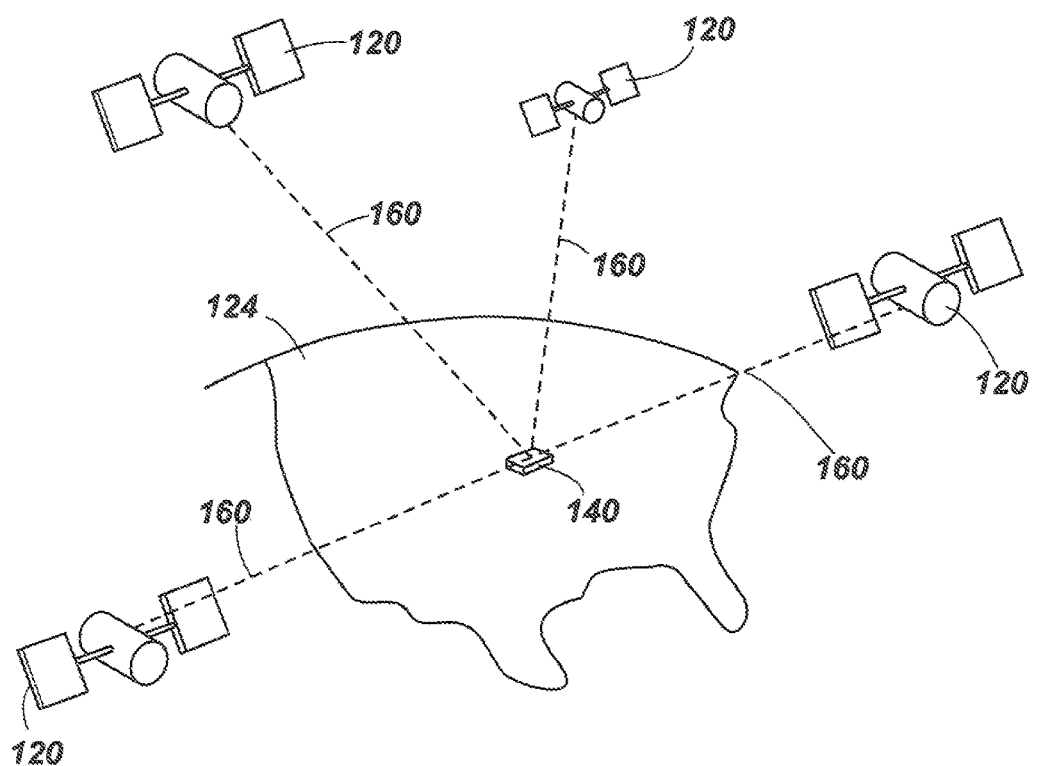
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in precise orbits. Based on these precise orbits, GPS satellites can relay their location to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize an accurate frequency standard accomplished with an accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
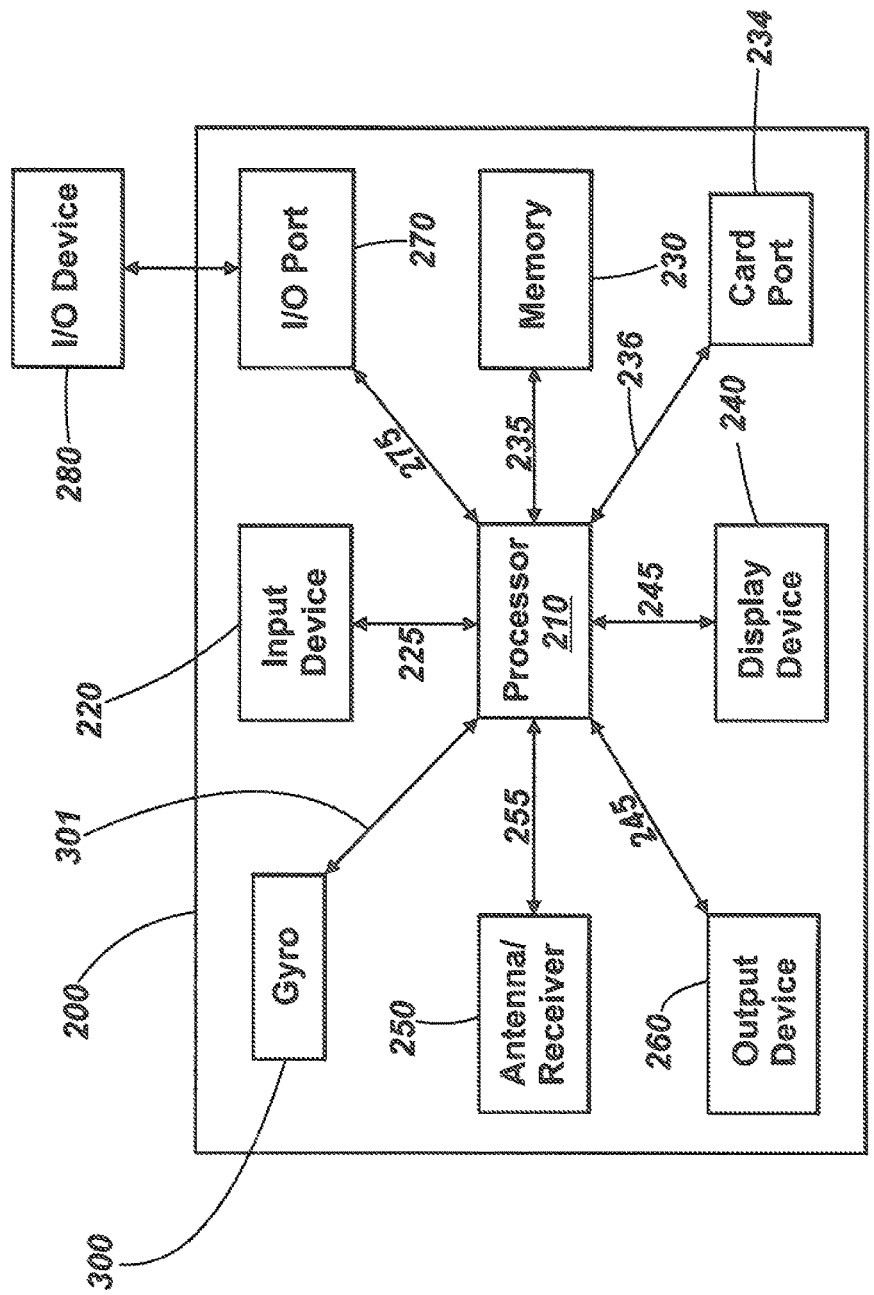
FIG. 2 is a schematic illustration of electronic components arranged to provide a navigation device.

FIG. 2 is an illustrative representation of electronic components of a navigation device 200 according to an embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In one arrangement the input device 220 and display screen 240 are integrated into an integrated input and display device, including a touchpad or touch screen input so that a user need only touch a portion of the display screen 240 to select one of a plurality of display choices or to activate one of a plurality of virtual buttons.

It is should equally be understood that in other embodiments, the input device 240 can include a microphone and software for receiving input voice commands as well.

The navigation device may include an output device 260, for example an audible output device (e.g. a loudspeaker). Such an output device 260 can produce audible information for a user of the navigation device 200.

In the navigation device 200, the processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory.

The processor 210 may also communicate with a card port 234, via a connection 236, into which a removable memory card (commonly referred to as a card) may be added to the device 200. In the embodiment being described the port is arranged to allow an SD (Secure Digital) card to be added. In other embodiments, the port may allow other formats of memory to be connected (such as Compact Flash (CF) cards, Memory Sticks™, xD memory cards, USB (Universal Serial Bus) Flash drives, MMC (MultiMedia) cards, SmartMedia cards, Microdrives, or the like).

The external I/O device 280 may include, but is not limited to an external listening device such as an earpiece for example. As such the external I/O device 280 may include a micro-phone jack socket (such as a 3.5 mm jack socket) to allow a user to use a set of headphones or other head piece in order to hear an output.

The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

In embodiments having a wireless connection this may be provided a Bluetooth chipset arranged to set a Bluetooth channel capable of passing at least audio to a paired device.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable and/or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use. Or indeed the device may be carried by a user as they walk, run, or the like.

Figure 3:
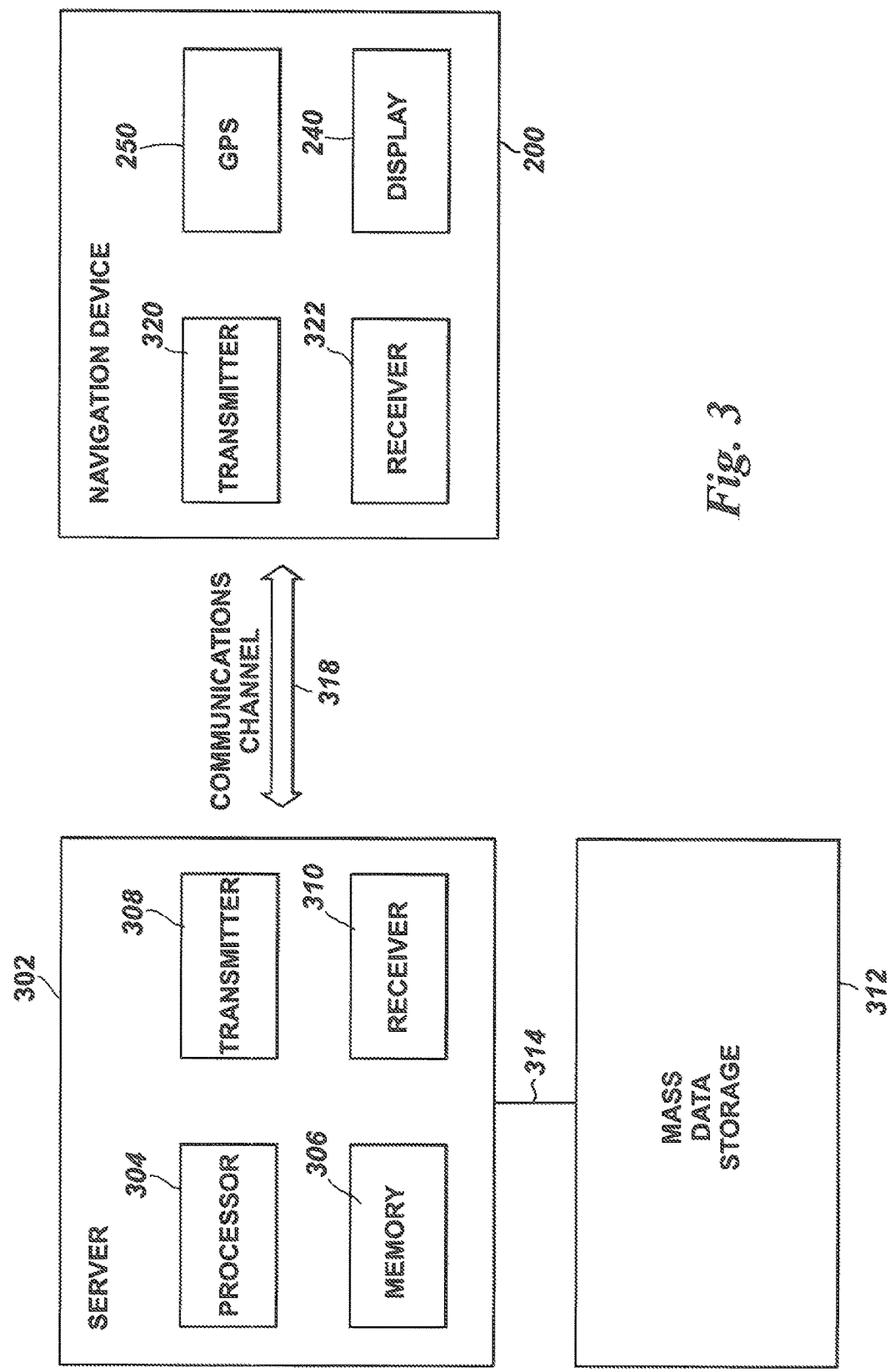
FIG. 3 is a schematic illustration of the manner in which a navigation device may receive information over a wireless communication channel.

Referring now to FIG. 3, in some embodiments, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

In other embodiments, the navigation device 200 may have the necessary circuitry therein to establish the communication channel 318 without the need for an intermediary device such as a mobile telephone or the like. In some embodiments, the navigation device may be a PND having a SIM (Subscriber Identity Module) and associated circuitry. In other embodiments, the navigation device 200 may comprise a mobile telephone.

The establishing of the network connection between the mobile device (via a service provider) and another device such as the server 302, using an Wide Area Network (such as the Internet) for example, can be done in a known manner. This can include use of TCP/IP layered protocol for example. The mobile device can utilize any number of communication standards such as CDMA (Code Division Multiple Access), GSM (Global System for Mobile telecommunications), UMTS (Universal Mobile Telecommunications System), GPRS (General Packet Radio Service), WIFI (the standard IEEE 802.11—any variety thereof), etc.

As such, an internet connection may be utilised which is achieved via data connection, via a mobile phone or mobile phone technology within the navigation device 200 for example. For this connection, an internet connection between the server 302 and the navigation device 200 is established.

The navigation device 200 can further complete a data connection with the mobile device, and eventually with the internet and server 302, via existing Bluetooth technology for example, in a known manner, wherein the data protocol can utilize any number of standards, such as the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In some embodiments, the navigation device 200 may also comprise a gyroscope, a compass or the like 300 which transmits data to the processor 210 via a connection 301. Such embodiments, can allow the processor 210 to track the position of the device 200 whilst it moves in the absence of position data being obtained from the GPS system. Such a gyroscope 300 or the like is often referred to as an Inertial Navigation System (INS).

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

Further, the processor 210 is arranged, from time to time, to upload the record of the whereabouts of the device 200 (ie the GPS data and the time stamp) to the server 302. In some embodiments in which the navigation device 200 has a permanent, or at least generally present, communication channel 318 connecting it to the server 302 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 210 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 230 and/or on a card inserted in the port 234 and to transmit these when a predetermined number have been stored. This predetermined number may be on the order of 20, 36, 100, 200 or any number in between. The skilled person will appreciate that the predetermined number is in part governed by the size of the memory 230/card within the port 234.

In other embodiments, which do not have a generally present communication channel 318 the processor 210 may be arranged to upload the record to the server 302 when a communication channel 318 is created. This may for example, be when the navigation device 200 is connected to a user's computer. Again, in such embodiments, the navigation device may be arranged to buffer the GPS fixes within the memory 230 or on a card inserted in the port 234. Should the memory 230 or card inserted in the port 234 become full of GPS fixes the navigation device may be arranged to deleted the oldest GPS fixes and as such it may be thought of as a First in First Out (FIFO) buffer.

In the embodiment being described, the record of the whereabouts comprises one or more traces with each trace representing the movement of that navigation device 200 within a period which may for example be a 24 hour period. As such, it is convenient if each period is arranged to coincide with a calendar day but in other embodiments, this need not be the case.

Generally, a user of a navigation device 200 gives his/her consent for the record of the devices whereabouts to be uploaded to the server 302. If no consent is given then no record is uploaded to the server 302. The navigation device itself, and/or a computer to which the navigation device is connected may be arranged to ask the user for his/her consent to such use of the record of whereabouts.

The server 302 is arranged to receive the record of the whereabouts of the device and to store this within the mass data storage 312 for processing. Thus, as time passes the mass data storage 312 accumulates a plurality of records of the whereabouts of navigation devices 200 which have uploaded data. It is likely that the server 302 will be in communication with a plurality of such navigation devices 200 and as such will build up a plurality of records from a plurality of devices.

The mass data storage 312 also contains map data. Such map data provides information about the location of road segments, points of interest and other such information that is generally found on map.

Figure 4A:
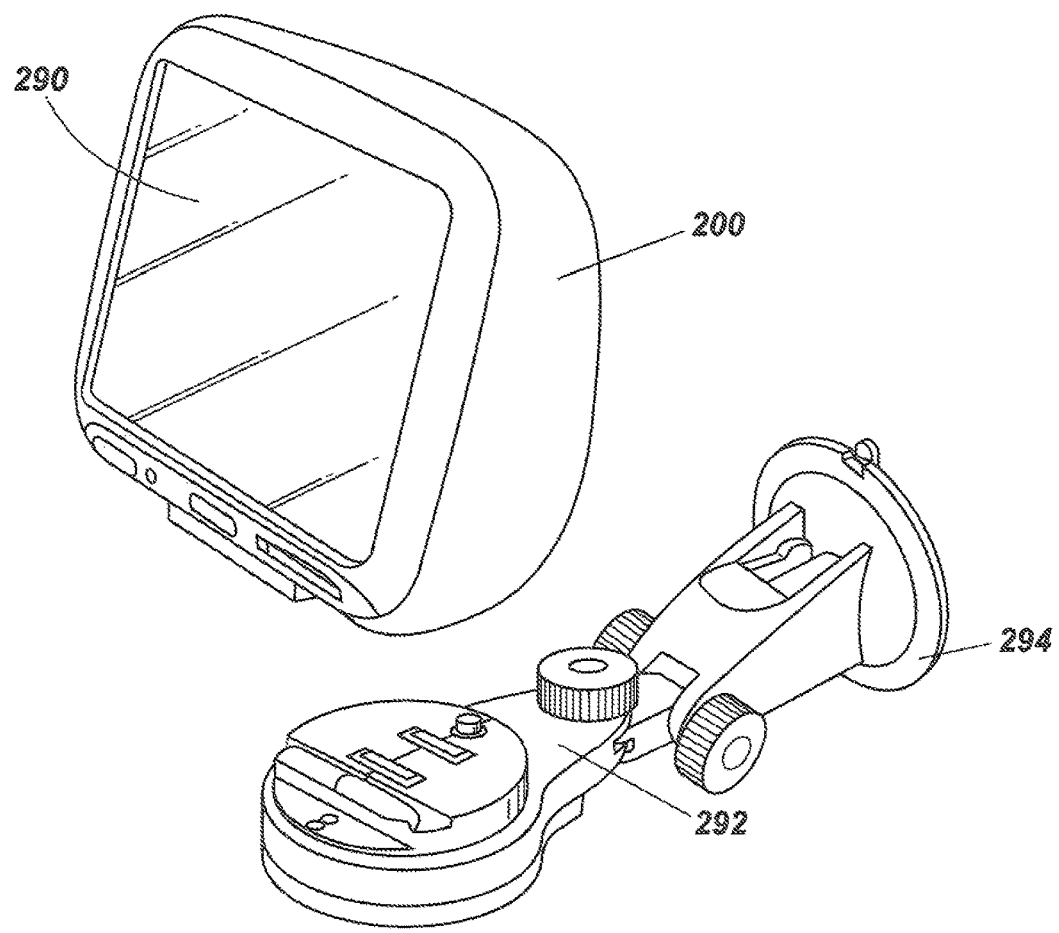
FIGS. 4A and 4B are illustrative perspective views of a navigation device.
Figure 4B:
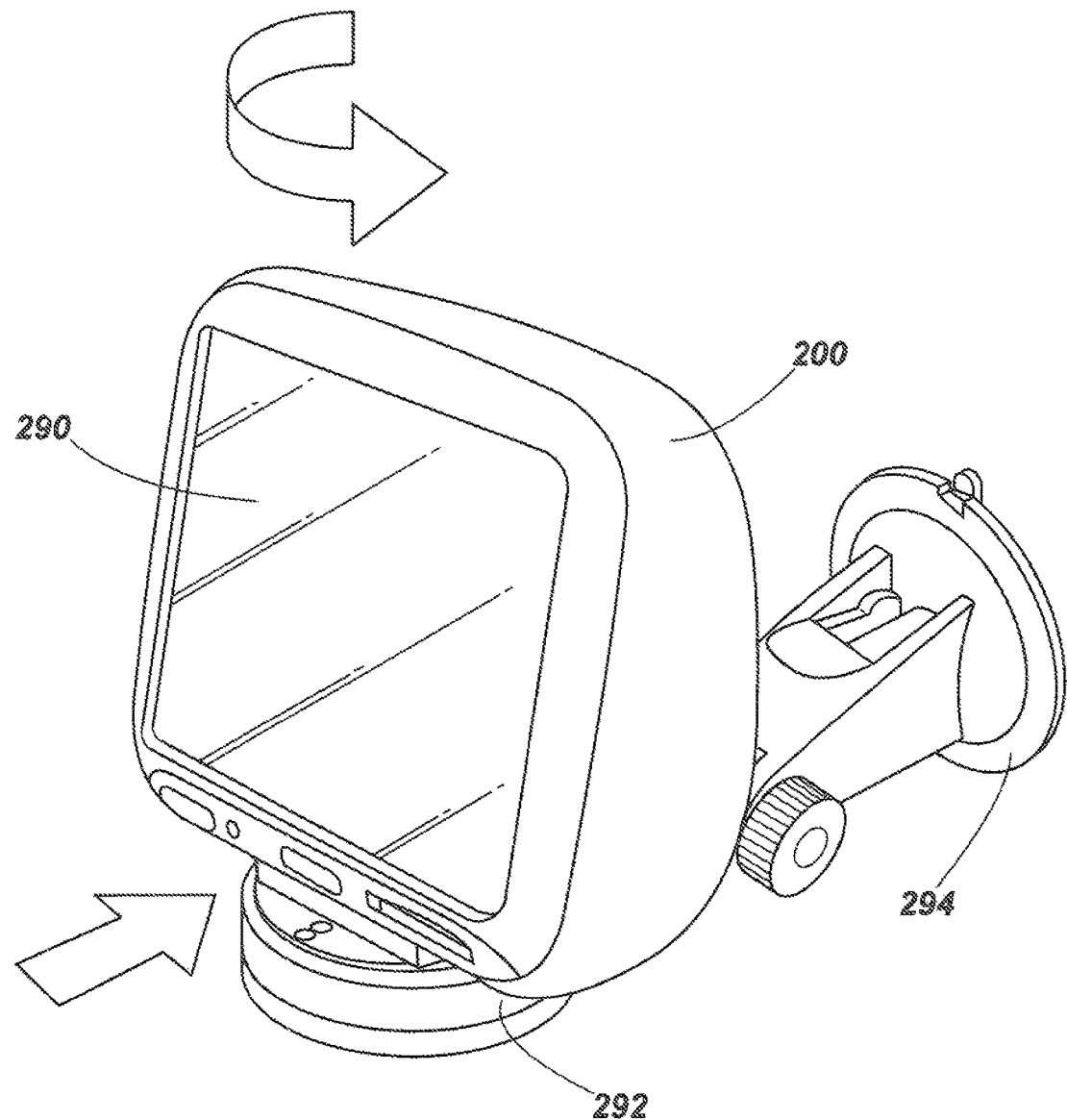

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
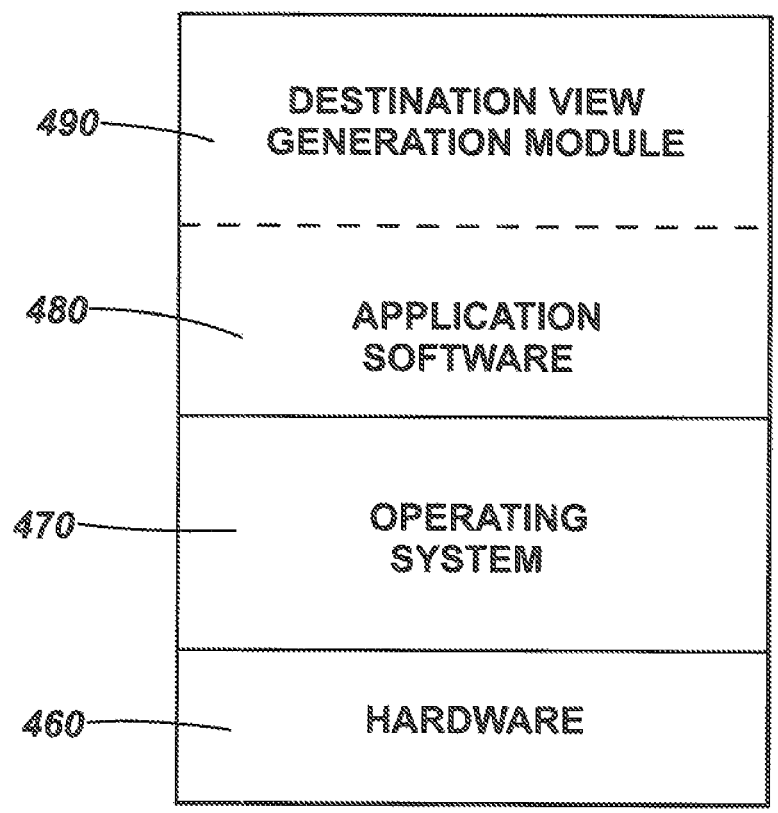
FIG. 5 is a schematic representation of the software employed by the navigation device.

Referring now to FIG. 5, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the Graphical User Interface (GUI) that supports core functions of the navigation device 200, for example map viewing, route planning, navigation functions and any other functions associated therewith.

In use, the data collected by the server 302 builds up a record of the whereabouts of the navigation devices 200 from the data transmitted to it by the navigation devices 200. This data may be thought of as position data. However, the skilled person will appreciate that the data may be uploaded to the server 302 by any suitable mechanism and direct upload from navigation devices 200 is not the only possibility. In other embodiments, the data could be uploaded via a network connection, a machine readable medium, or the like.

The record of the whereabouts of the navigation devices 200 comprises a plurality of individual trips where each trip represents at least a portion journey of a navigation device. In one particular embodiment, a journey is defined as starting when the navigation device 200 acquires a signal from the GPS network and ends when the navigation device loses the signal from the GPS network. Each of these may be thought of as a trip terminal position and as such, a physical journey of the navigation device 200 may comprise a plurality of trips as that device gains and loses satellite signals. For example, if the navigation device 200 were to pass under a tunnel then it is likely that it would lose signal and end a trip. Also, if the navigation device 200 were to enter a building then it might also lose signal and so end a trip.

Figure 9:
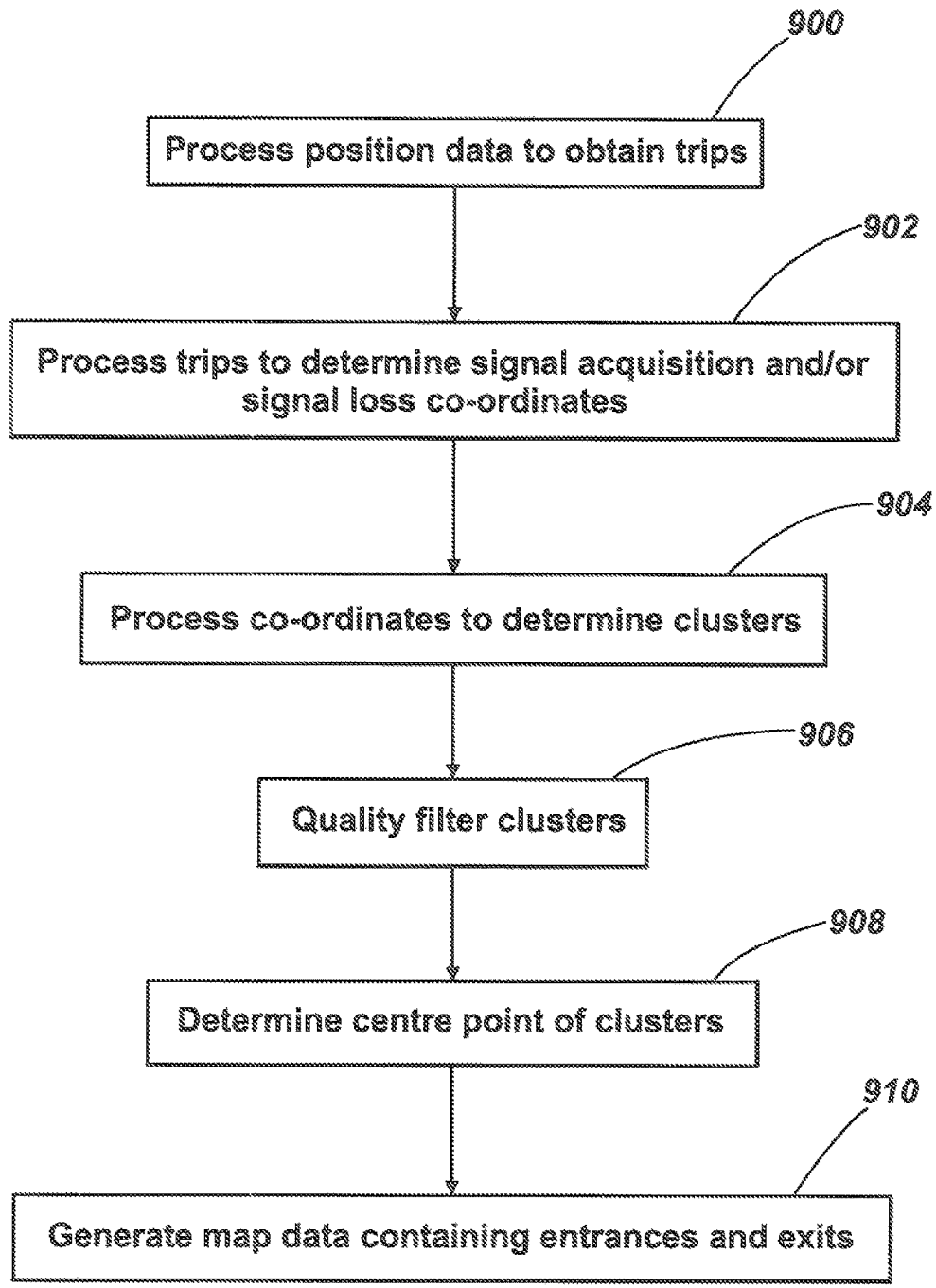

A first embodiment of the invention is now described with reference to the flow chart of FIG. 9.

Figure 6:
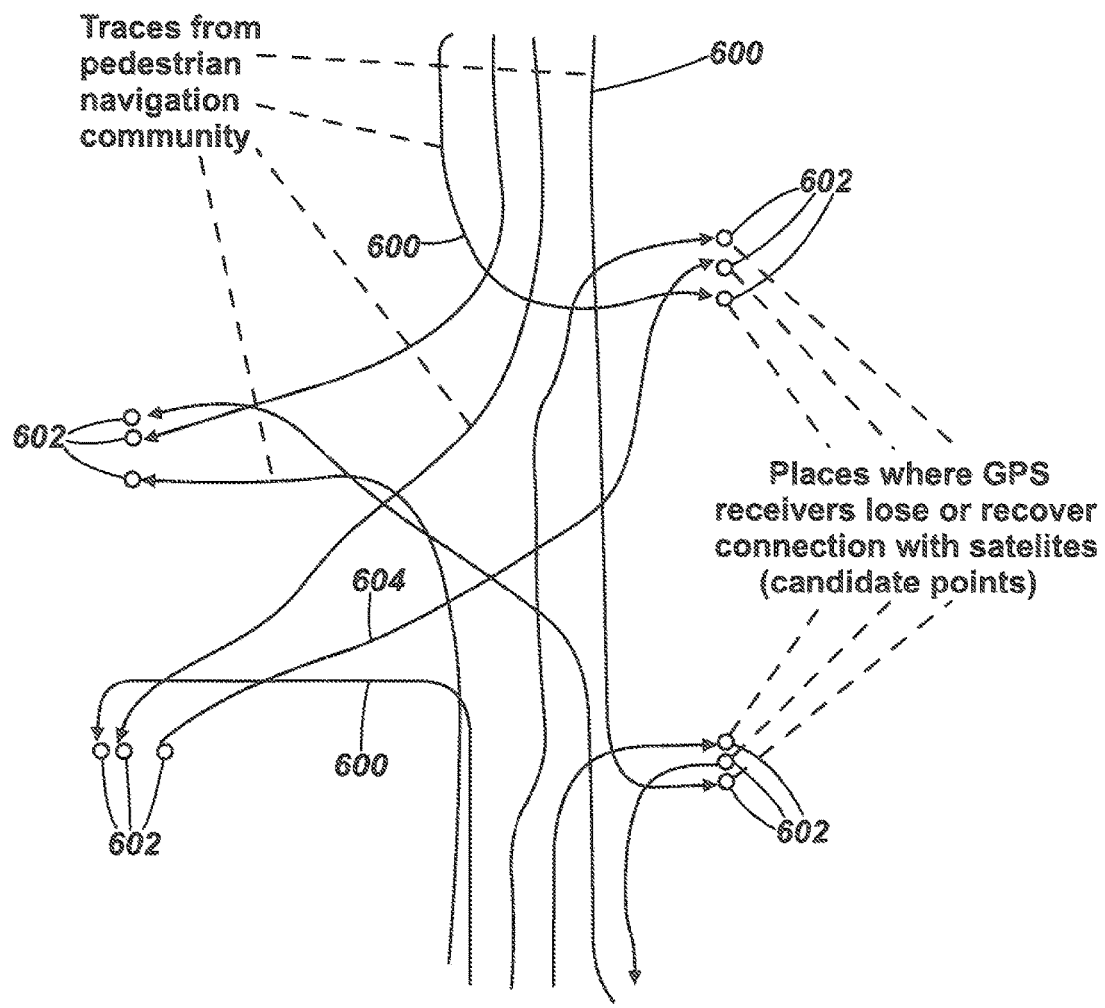
FIGS. 6 to 9 outline stages of a first embodiment of the invention.

FIG. 6 shows a plurality of arrows (eg 600) each of which represents at least a portion of a trip with an arrow indicating a direction of travel. In the Figure the loss/acquisition of a satellite signal is represented by a circle 602 and by definition a circle is located in association with a trip 600. Thus, it will be seen that the arrow 604 represents a complete trip since it has signal acquisition at the start and a signal loss at an end.

Thus, in a first stage of the method of this embodiment of the invention the server 302 processes the record of the whereabouts to determine each trip 900 and subsequently in step 902 processes the trips to determine the co-ordinates at which each trip begins and ends and as such determines the co-ordinates at the signal acquisition point and the point at which the signal was lost (ie the points 602); ie the trip terminal positions are determined. The skilled person will appreciate that other embodiments may only determine the acquisition points or the loss of signal points. Thus the server 302, by the processing of the position data, generates a plurality of co-ordinates. Thus, the trip terminal positions are positions at which a trip from a navigation device acquired sufficient satellite fixes and began to generate GPS fixes and/or lost sufficient satellite fixes and stopped generating GPS fixes.

Figure 7:
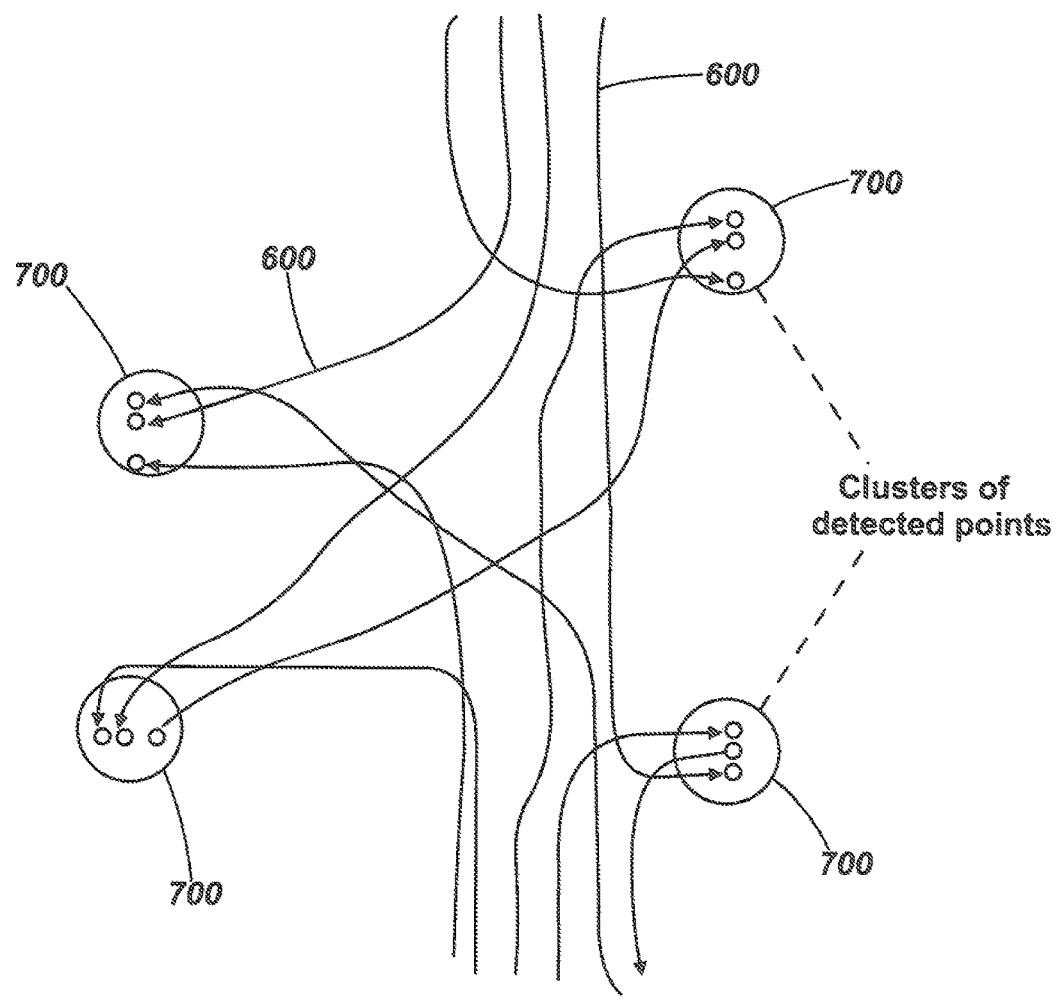

In a next stage 904 of the method, as represented in FIG. 7, the server 302 performs a cluster analysis on the co-ordinates that it determines from the first stage to generate a list of candidate clusters 700. These clusters 700 represent a location in which a plurality of trips 600 started and/or terminated.

In other embodiments, mathematical techniques other than clustering may be used and as such those methods will perform statistical analysis on the on the terminal positions.

The skilled person will appreciate that cluster analysis (clustering) is itself a statistical analysis technique.

In step 906 the clusters are processed in order to reject clusters which have fewer than a predetermined number of co-ordinates therewithin. Such a step helps to ensure that the cluster are of sufficient quality and are not triggered by random noise in the data. The skilled person will appreciate that if the predetermined number is increased then the quality of the clusters is increased although their number is likely to be reduced.

Figure 8:
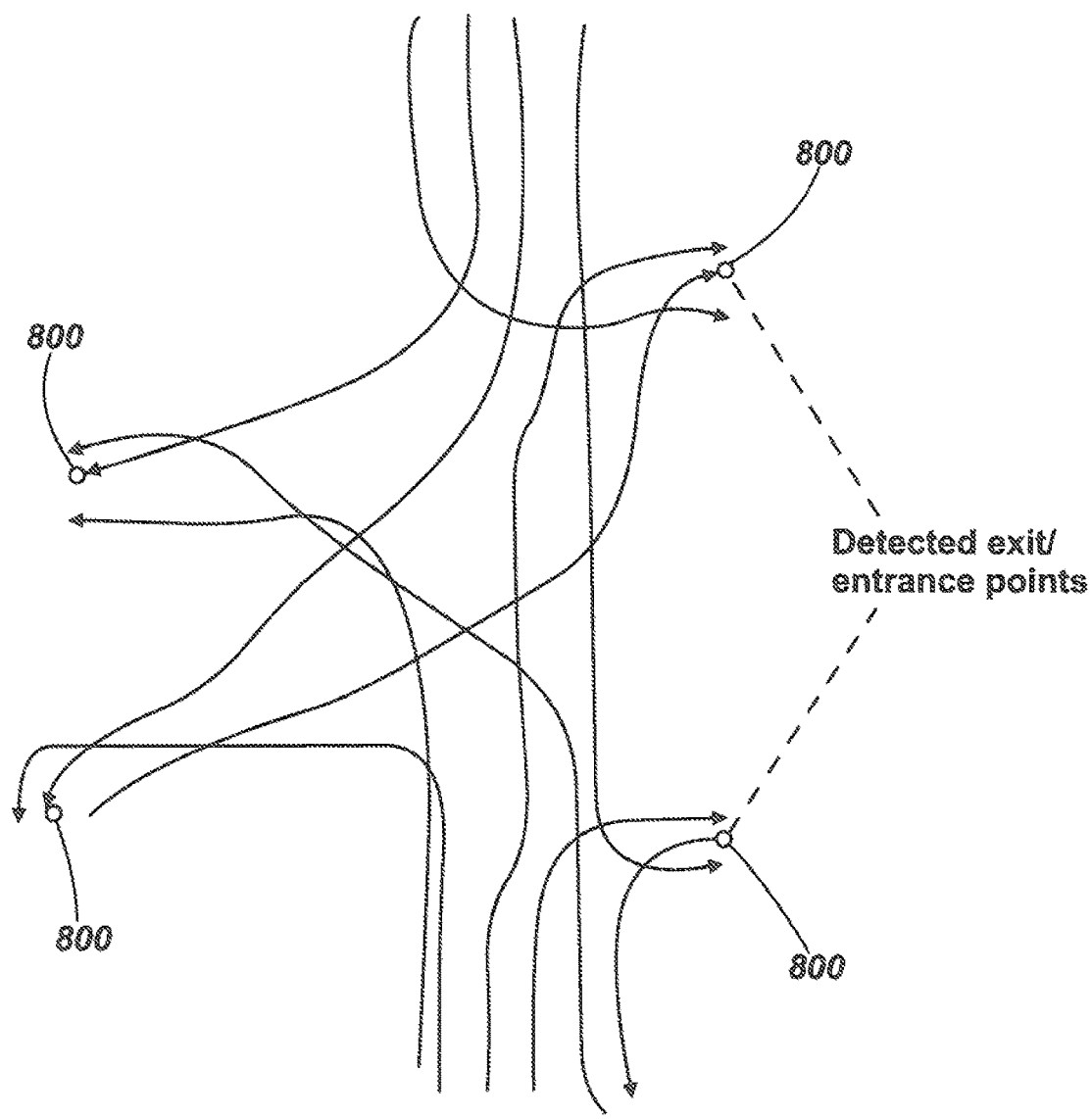

Subsequently, in step 908, each cluster 700 is processed in order to determine the co-ordinates of a centre region of the cluster which may be thought of as an origin location; ie it is the average origin location of all the trips that generated a trip terminal position that went to make up that cluster. This is represented in FIG. 8 in which the centre regions have been marked with the reference 800. These centre regions are assumed to be an entrance and/or an exit to a structure that causes the loss of the satellite signal; ie when the navigation device 200 is within the structure it cannot receive the satellite signal.

These structures include things such as buildings, underpasses, bridges or the like.

In step 910 of the method the determined co-ordinates are incorporated into map data and further maps are generated using this data for use in navigation devices 200 or the like. Such map data is advantageous as it has the entrances of buildings, etc. marked thereon. A further advantage of this is that it then allows navigation devices 200 which use the data can generate routes from/to an entrance/exit rather than just to a building. Some embodiments may thus associate the entrance/exit with a building within the map data.

In variations to this embodiment it becomes possible to determine whether the co-ordinate 800 represents an entrance and/or an exit by determining the direction of travel of the navigation device 200 that generated that trip. If all (or at least substantially all) trip leave the co-ordinate 800 in one direction then it is perhaps likely that entrance/exit is uni-directional and only allows one of ingress and egress.

Figure 13:
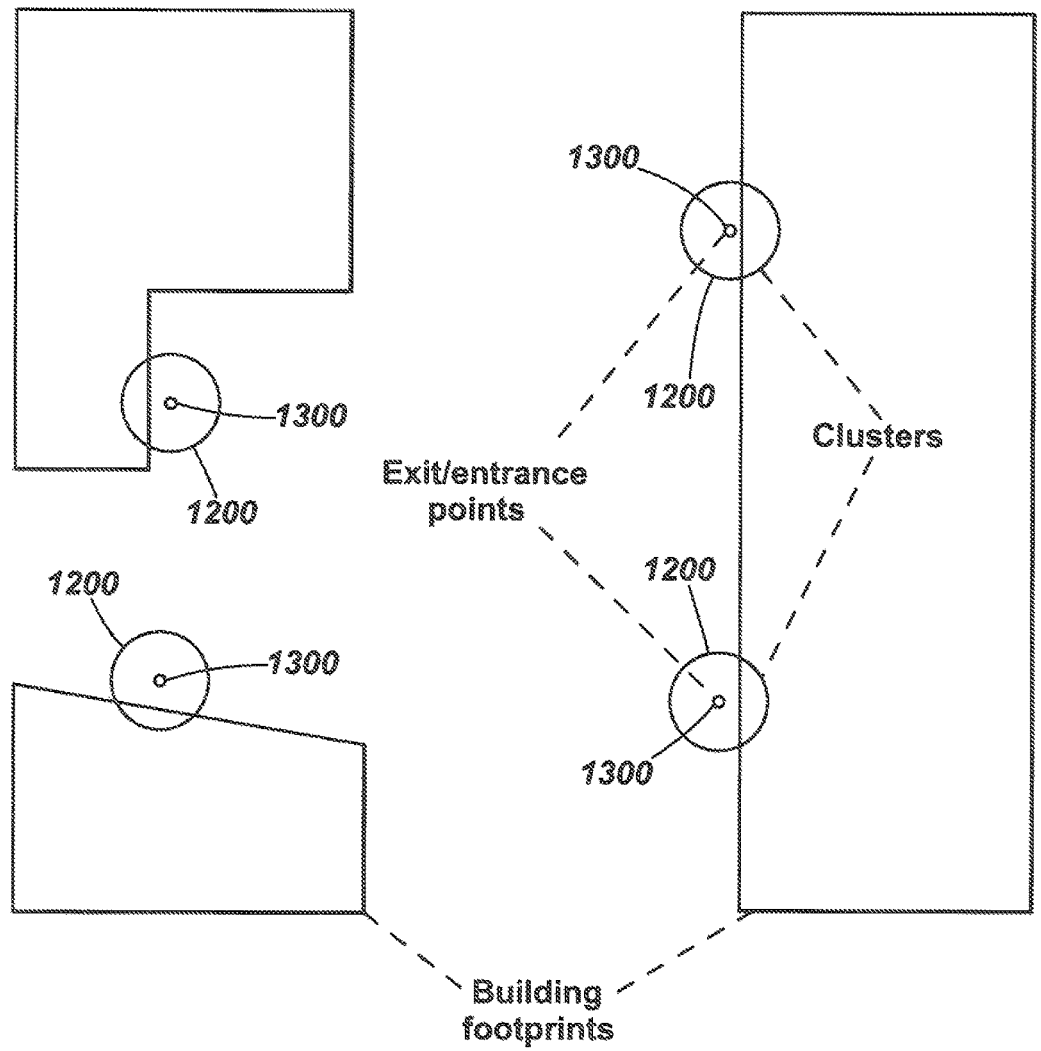
Figure 14:
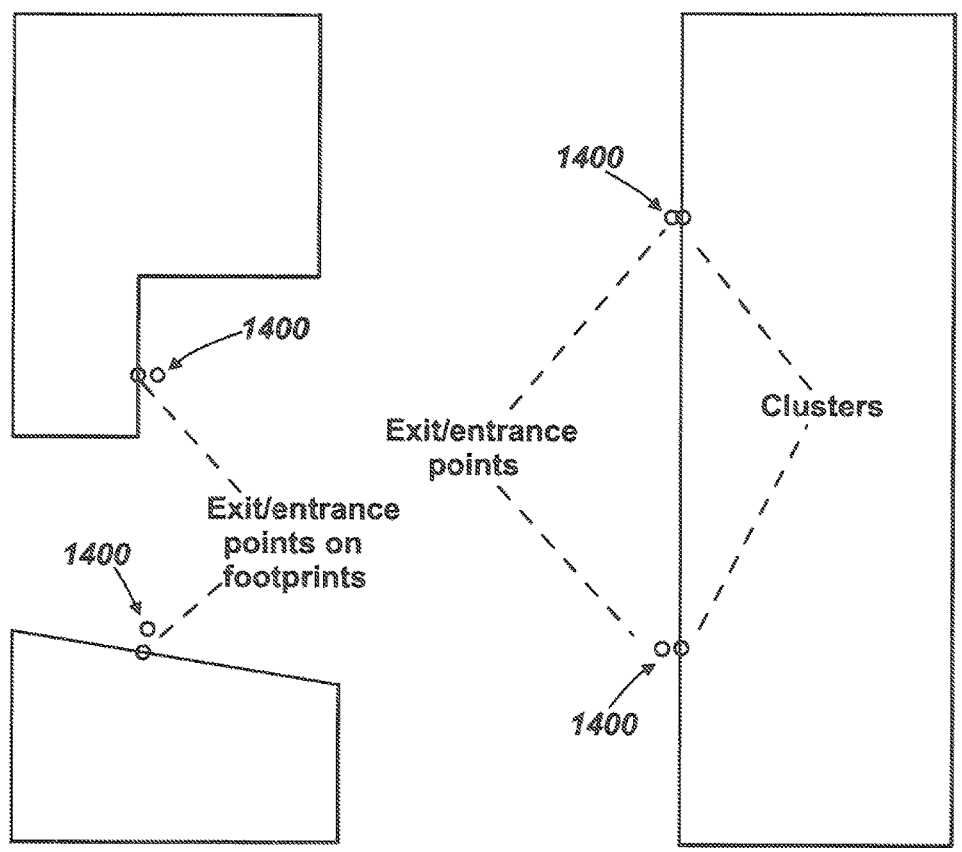
Figure 15:
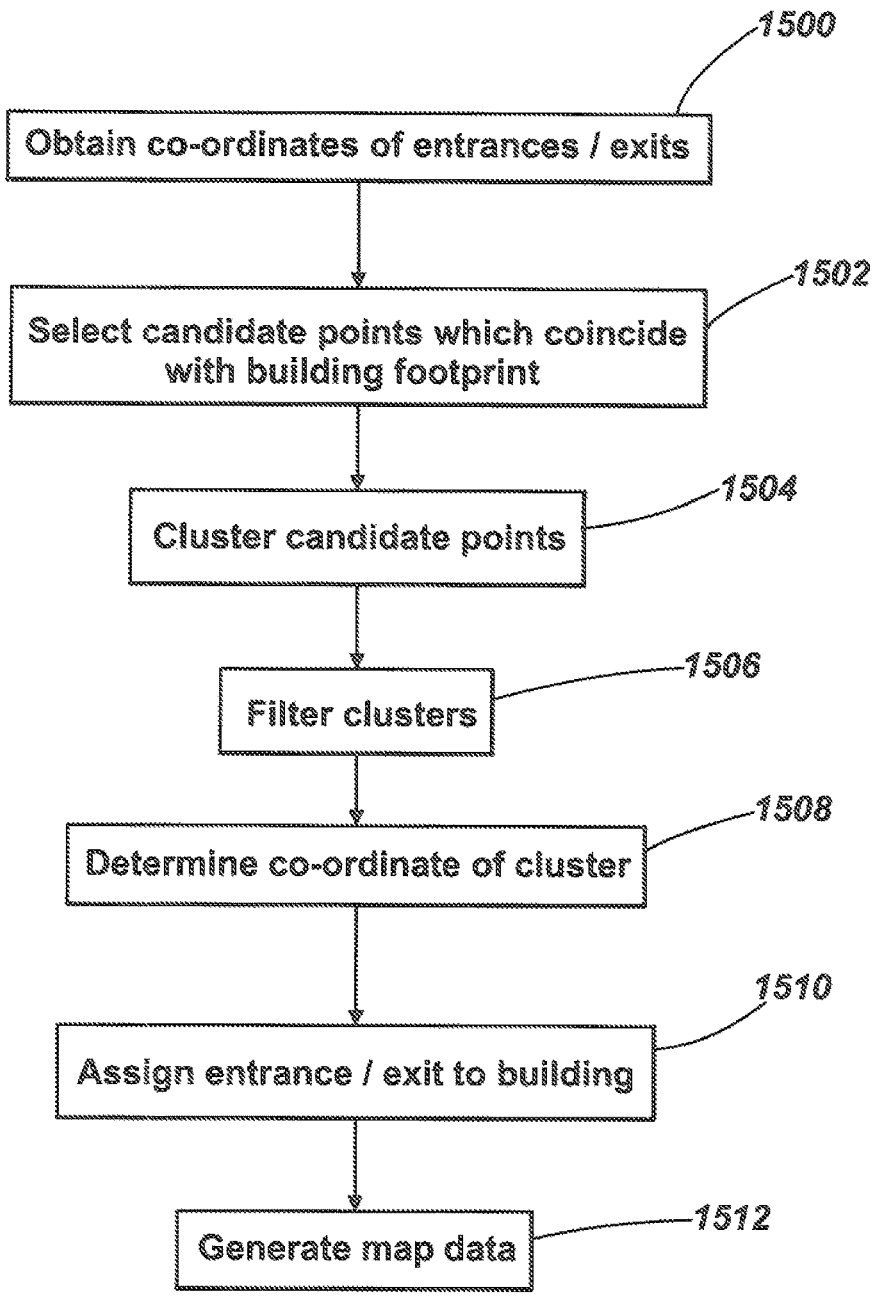
Figure 16:
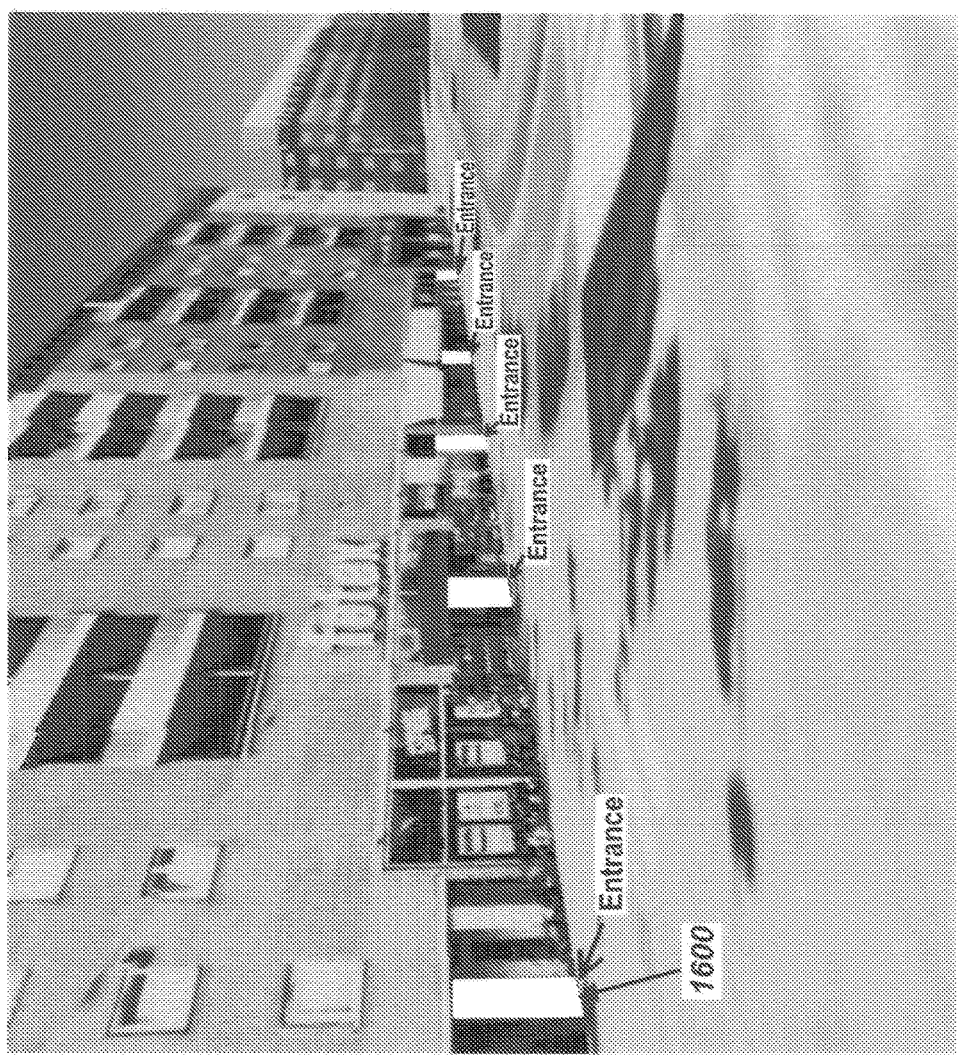
FIGS. 16 to 21 outline stages of a third embodiment of the invention.

In a second embodiment, as described in relation to FIGS. 10 to 15, the method of the first embodiment is extended in order to include reference to building footprints. A flow chart is shown in FIG. 15. In this embodiment, so-called INS data (Inertial Navigation System) data can be used. Such data can be uploaded to the server 302 in the same manner as GPS position data is uploaded. As such, the INS data may also be thought of as position data.

Figure 10:
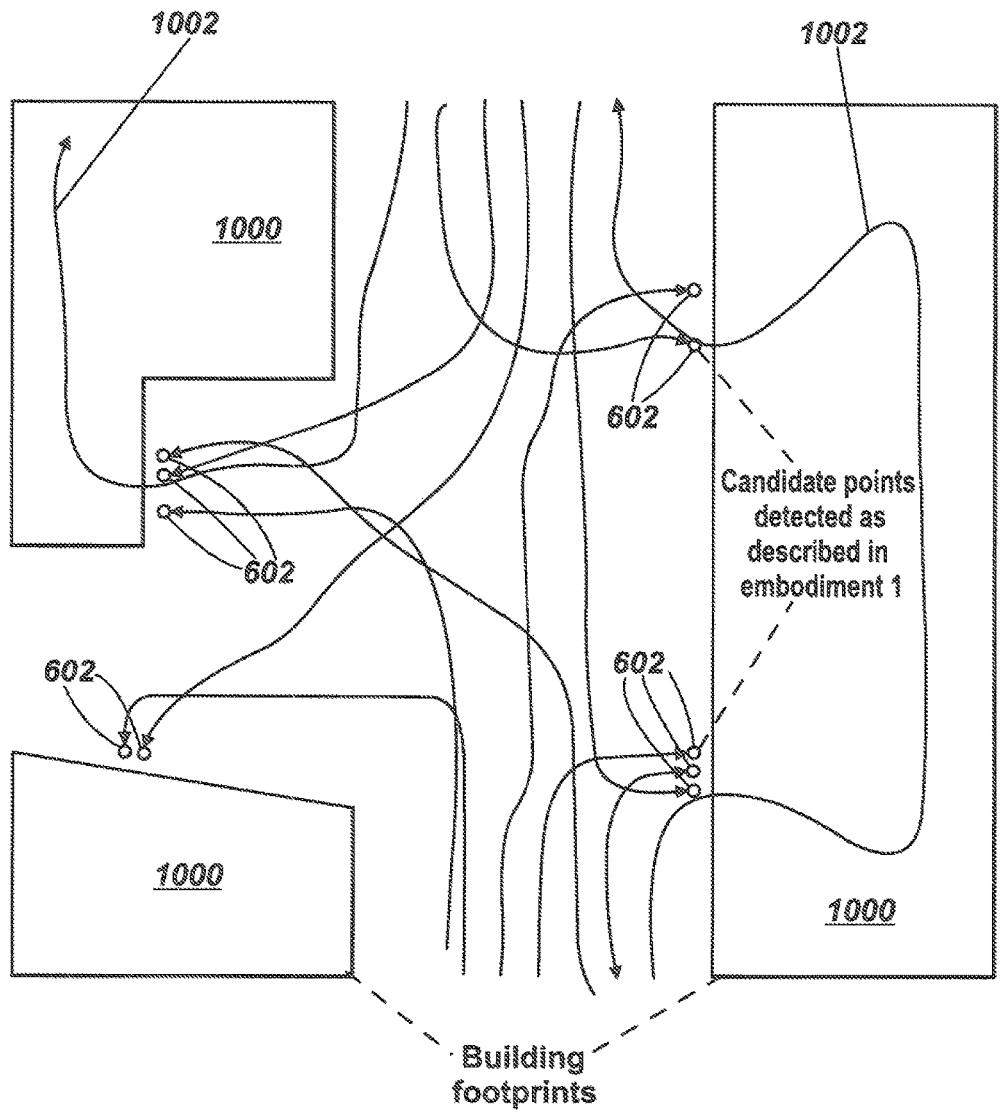
FIGS. 10 to 15 outline stages of a second embodiment of the invention.
Figure 11:
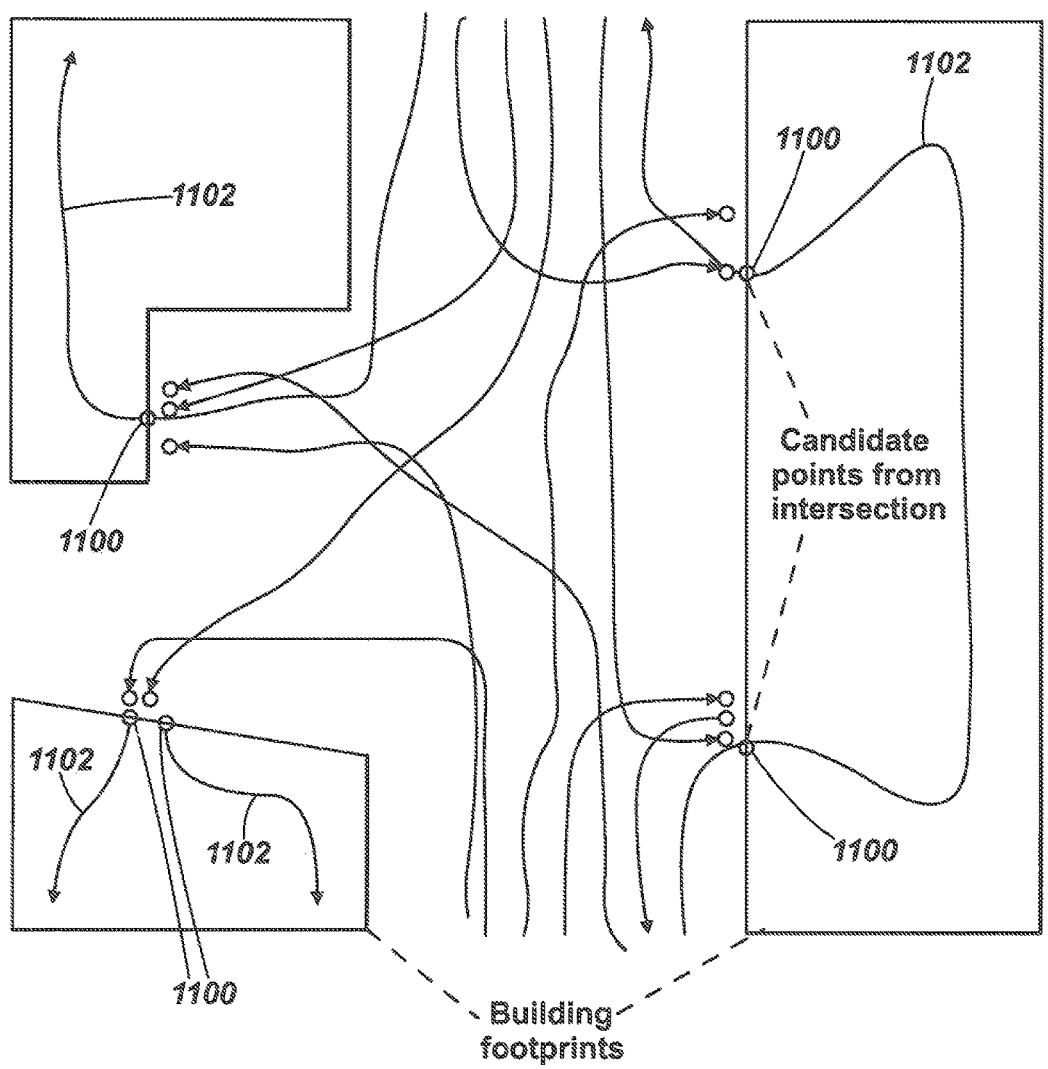

As a first step of the method 1500, the method of FIGS. 6 to 9 is performed and the output of this step is shown in FIG. 10 but with the footprints of buildings 1000 now shown.

However, the data collected in this embodiment also includes INS data and this is shown by the arrows 1002 within two of the building footprints 1000.

The next step 1502 of the method is to locate candidate points for traces derived from both GPS and INS data from intersections between traces and footprints of the buildings. Thus, if and end/start point of a trip (generated from either the GPS data or INS data) co-insides with an edge region of a footprint it is selected as a candidate point. Points derived from INS data are shown at 1100 in FIG. 11. The paths that are derived from INS data are referenced at 1102.

Figure 12:
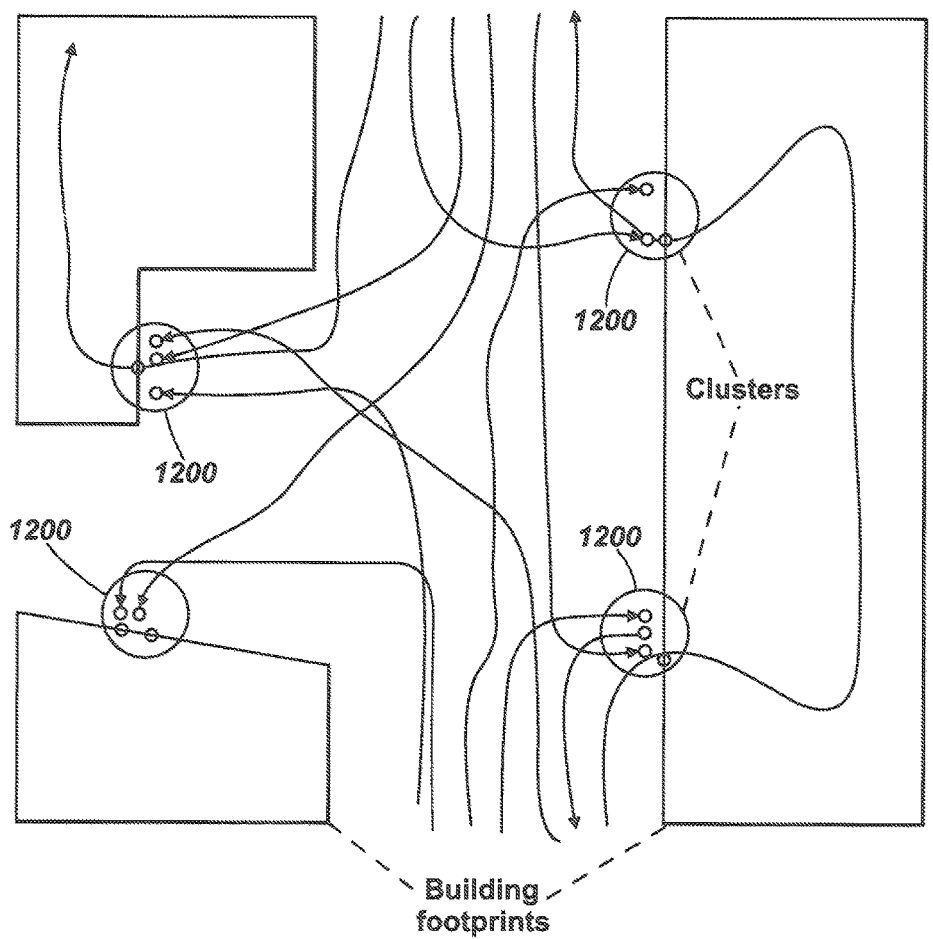

Subsequently, in step 1504, the points (which now include both GPS and INS data) are clustered to determine groups of co-ordinates. Such clusters are shown in FIG. 12 at 1200.

In step 1506 the clusters are filtered in order to remove any clusters that do not contain sufficient number of co-ordinates.

In step 1508, the co-ordinates of a centre region of the clusters 1200 are determined. The skilled person will appreciate that in embodiments of the invention need not determine the centre of the clusters determined therein and could determine any other reference to the cluster. However, it is likely that the centre of the cluster most closely represent the position of the location of the entrance, exit or the like that it represents. The centre regions of such clusters are shown in FIG. 13 at 1300.

In step 1510 these so-determined centre points 1300 are assigned to the building footprints 1000 that were used to generate them as exit and/or entrance points to that building. Such entrance and exit points are shown in FIG. 14 at 1400.

In step 1512 further map data can be generated for subsequent use with navigation devices 200 and the like utilising the entrances and/or exits which have been associated with the building footprints.

A third embodiment of the invention will be described in relation to FIGS. 16 to 21. This embodiment can be thought of as an extension to the second embodiment described in relation to FIGS. 10 15; or indeed as an extension to the first embodiment as described in relation to FIGS. 6 to 9.

In a first stage of the embodiment, the entrance/exit information already generate is taken 2100.

Subsequently 3D image data is taken and processed to locate these entrances and exits upon that 3D image data. In the Figure shown this data represents that entrance and/or exits of a building which are shown as blocks 1600. Such 3D data can be obtained from a variety of sources including satellite images (may be for example Google™ Earth™ or the like), other images, 3D scanning, or the like.

This method can be further enhanced by fusing the exit/entrance information with the results of image processing that provides candidate positions for doors and/or windows. Thus, in step 2104 the images are processed to obtain the candidate openings before the data is fused in step 2106. Such an embodiment therefore determines potential positions for exits and/or entrances within an image.

Figure 17:
Figure 18:
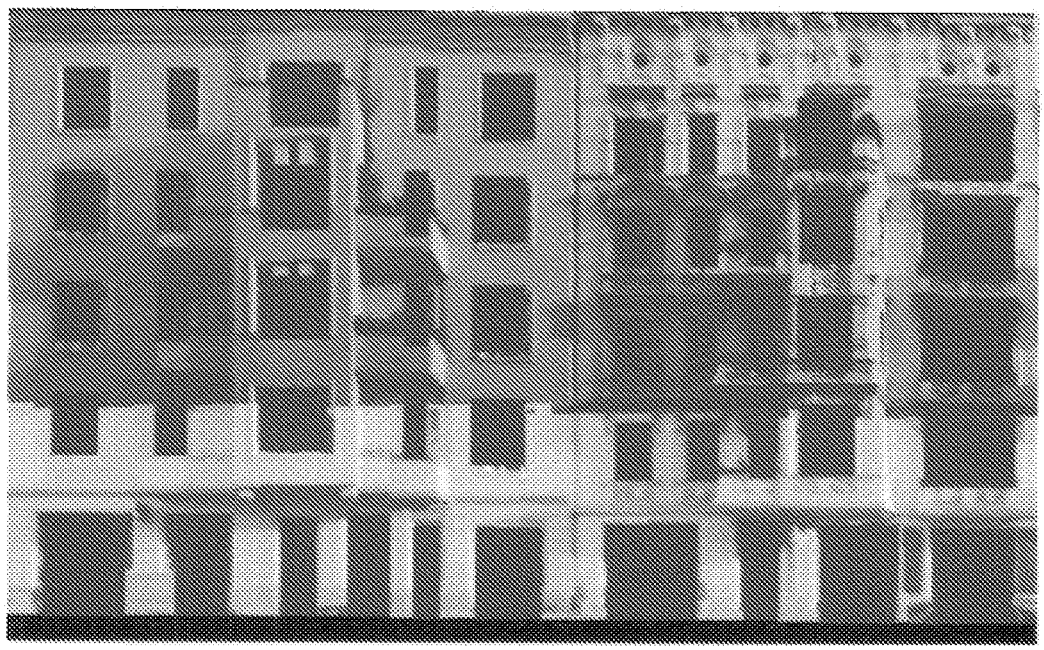

FIG. 17 shows an image of a building pre-performance of step 2104 and FIG. 18 shows the image of FIG. 17 in which the candidate openings identified in step 2106 have been marked.

Figure 19:

FIG. 19 shows the result of the data fusion step 2106 and is seen that only four of the candidate openings have been confirmed by the entrance/exit information identified in the first and/or second embodiments. These entrance/exits are shown by the rectangles 1900.

Figure 20:
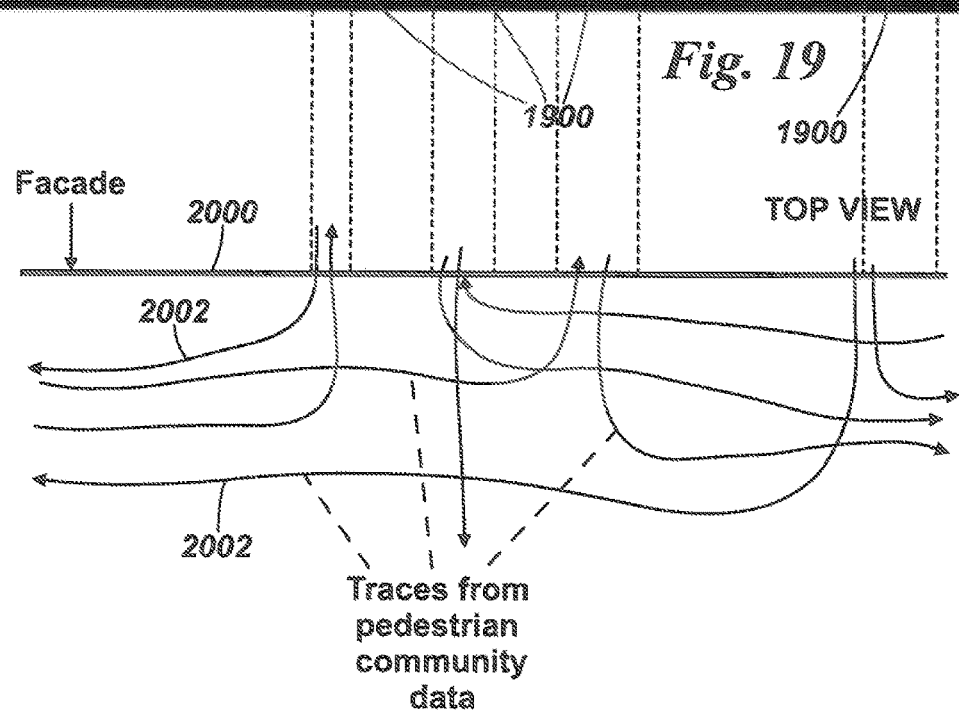
Figure 21:
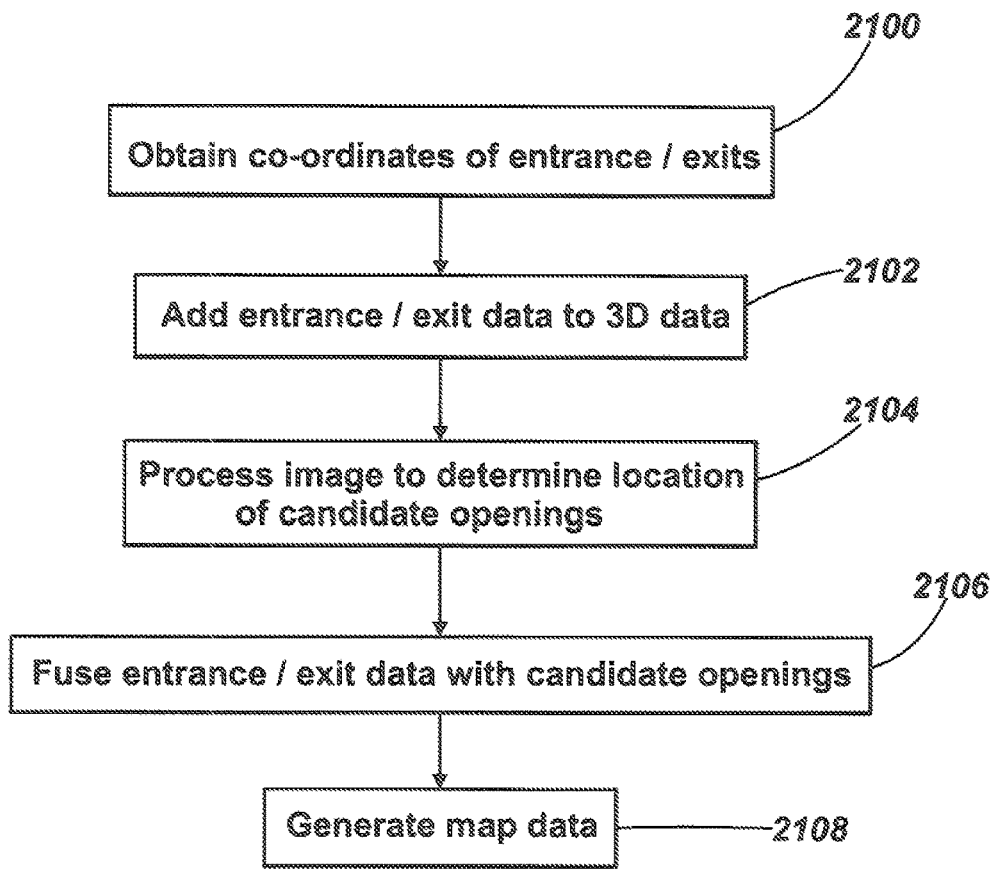

FIG. 20 shows a plan view of FIG. 19 in which the identified entrances of FIG. 19 have been aligned with the facade 2000 of FIG. 20. Some of the trips 2002 that have gone to generate the exit/entrance information are shown. Thus, entrances/exits that have been determined to be coincident with an origin location have been assigned to that origin location. More details of this method are disclosed in patent application WO2008/044913 (PCT/NL2006/050259) which is hereby incorporated by reference and the skilled person is directed to read this document to better understand the third embodiment described herein.

In a final step of the method further map data is generated 2108 which contains the so calculated positions of entrances and/or exits.

Figure 22:
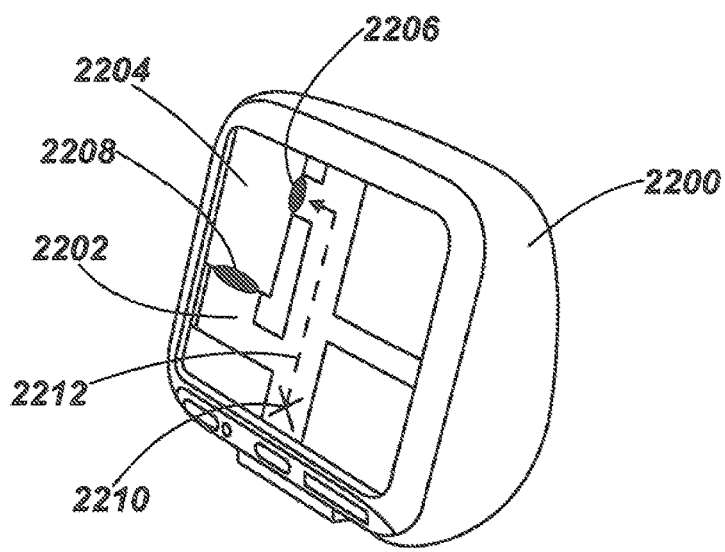
FIG. 22 shows a navigation device embodying earlier embodiments of the invention.

FIG. 22 shows a navigation device 2200, much as described in relation to FIG. 4. This navigation device 2200 has been programmed with map data which comprises origin locations. On the display 2202 a building 2204 is shown which has two entrances/exits 2206, 2208.

The user's current location is shown with an 'x' 2210 and the navigation device 2200 is providing a route 2210 (shown with the dashed line) that it has determined to one of the entrances/exits 2206. As such, the instructions are perhaps more useful than they might have been if they were simply to the building 2204.

The skilled person will appreciate that more than one embodiment of the invention has been described and that features described in relation to one embodiment may be applied mutatis mutandis to another embodiment.

The invention claimed is:

1. A computerised method of creating map data from a plurality of trips where each trip comprises position data derived from the positions of at least one navigation device over a period of time, the method comprising using a processing circuitry to perform the following steps:
   processing the position data;
   calculating, from the processing of the position data, trip terminal positions at which the navigation device started to generate positions and/or stopped generating positions and which provide an end point of a trip;
   performing statistical analysis on the terminal positions in order to determine origin locations at which trips commonly terminate and/or originate;
   identifying, based on each of the origin locations, a location of an entrance and/or exit to a corresponding structure; and
   incorporating the origin locations into map data, the incorporating comprising placing, in the map data, indications of the locations of entrances and/or exits of the corresponding structures for each of the origin locations.

2. A method according to claim 1 which generates a coordinate for each origin location.

3. A method according to claim 1 in which the statistical analysis comprises performing clustering on the terminal positions in order to generate one or more cluster to obtain the origin locations.

4. A method according to claim 3 which comprises determining a coordinate associated with each cluster, which may be a centre region of a cluster.

5. The method of claim 4, wherein the centre region is assigned to a building footprint.

6. The method of claim 3, wherein the performed clustering rejects clustering a group of coordinates below a predetermined number.

7. A method according to claim 1 in which, the method comprises marking within the map data the positions of structures that contain the origin locations and may further comprise marking the origin locations in association with the structures.

8. A method according to claim 1 which fuses position data from more than one data source to generate at least one of the terminal positions and the origin locations which may be from the group comprising: GPS data; INS (Inertial Navigation System) Data; image processing.

9. A method according to claim 1 in which origin locations generated by the method are subsequently merged with data from other sources, which may include data from the group comprising: GPS data; INS (Inertial Navigation System) Data; image processing data.

10. A method according to claim 1 which performs image processing on an image and determines potential positions for at least one of exits and entrances within that image and subsequently assigns an origin location to the location of the so determined exit and/or entrance.

11. The method of claim 10, wherein the image is a 3D Image.

12. The method of claim 11 fusing the entrance and exit information with the 3D image to provide candidate positions for doors and windows.

13. The method of claim 1, wherein the positional data is acquired from one or more pedestrians.

14. The method of claim 1, wherein the positional data is acquired when the navigation device acquires a signal from a GPS network and ends when the navigation device loses the signal from the GPS network.

15. The method of claim 1, wherein the structure is one of: buildings, underpasses and bridges.

16. The method according to claim 1, further comprising:
   determining whether each origin location is associated with an entrance and/or exit for the corresponding structure, the determination being based at least in part on a direction of travel.

17. A machine comprising a processor and memory and arranged to create map data, wherein the machine is arranged to receive and process position data from at least one source, the position data comprises the positions of at least one navigation device over a period of time, the machine being arranged to:
   process the position data;
   calculate trip terminal positions at which the navigation device generating that trip started to generate and/or stopped generating positions;
   perform statistical processing on the terminal positions between the trips in order to determine origin locations at which a plurality of trips terminate and/or originate;
   identify, based on each of the origin locations, a location of an entrance and/or exit to a corresponding structure; and
   incorporate the origin locations into map data, the incorporating comprising placing, in the map data, indications of the locations of entrances and/or exits of the corresponding structures for each of the origin locations.

18. The machine according to claim 17, wherein the machine uses a signal acquisition and signal loss of the at least one navigation device to determine trip start and/or stop positions.

19. The machine according to claim 17, wherein the machine is further arranged to:
   determine whether each origin location is associated with an entrance and/or exit for the corresponding structure, the determination being based at least in part on a direction of travel.

20. A non-transitory machine readable medium containing instructions which, when executed by a machine, cause the machine to perform a method for creating map data from a plurality of trips, each trip comprising position data derived from positions of at least one navigation device over a period of time, the method comprising:
   processing the position data;
   calculating, based on the processing of the position data, trip terminal positions at which the navigation device started to generate positions and/or stopped generating positions and which provide an end point of a trip;
   performing a statistical analysis on the terminal positions to determine origin locations at which trips commonly terminate and/or originate;

identifying, based on each of the origin locations, a location of an entrance and/or exit to a corresponding structure; and incorporating the origin locations into map data, the incorporating comprising placing, in the map data, indications of the locations of entrances and/or exits of the corresponding structures for each of the origin locations.

* * * * *